United States Patent
Binder et al.

(10) Patent No.: US 11,472,390 B2
(45) Date of Patent: Oct. 18, 2022

(54) METHOD FOR MONITORING AN ABS CONTROL PROCEDURE IN AN ELECTRICALLY CONTROLLABLE BRAKE SYSTEM AND ELECTRONICALLY CONTROLLABLE BRAKE SYSTEM

(71) Applicant: WABCO Europe BVBA, Brussels (BE)

(72) Inventors: Hartmut Binder, Hannover (DE); Andreas Marx, Seelze (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 1032 days.

(21) Appl. No.: 16/092,223

(22) PCT Filed: Mar. 31, 2017

(86) PCT No.: PCT/EP2017/000396
§ 371 (c)(1),
(2) Date: Oct. 9, 2018

(87) PCT Pub. No.: WO2017/211436
PCT Pub. Date: Dec. 14, 2017

(65) Prior Publication Data
US 2021/0206361 A1 Jul. 8, 2021

(30) Foreign Application Priority Data

Jun. 10, 2016 (DE) ..................... 10 2016 007 149.4

(51) Int. Cl.
*B60T 7/12* (2006.01)
*B60T 8/96* (2006.01)
(Continued)

(52) U.S. Cl.
CPC ............... *B60T 8/96* (2013.01); *B60T 8/176* (2013.01); *B60T 8/885* (2013.01); *B60T 15/027* (2013.01);
(Continued)

(58) Field of Classification Search
CPC . B60T 8/96; B60T 8/176; B60T 8/885; B60T 15/027; B60T 15/028;
(Continued)

(56) References Cited

U.S. PATENT DOCUMENTS 4,546,437 A 10/1985 Bleckmann et al.
5,458,404 A 10/1995 Fennel et al.
(Continued)

FOREIGN PATENT DOCUMENTS

CN 104635715 A 5/2015
DE 3234637 A1 3/1984
(Continued)

*Primary Examiner* — Shardul D Patel
(74) *Attorney, Agent, or Firm* — Leydig, Voit & Mayer, Ltd.

(57) ABSTRACT

A method for monitoring an ABS control procedure in an electrically controllable brake system in a vehicle includes reading in input signals, wherein based on the input signals it is possible to derive currently prevailing control variables for the ABS control procedure and ABS control parameters that relate to a brake slip-controlled actuation of an ABS control valve of the brake system. The method further includes checking whether it follows that an activation of any ABS control valve that is allocated to a wheel of the vehicle is requested, and whether it follows that an ABS brake slip incident is present at at least a first wheel of the vehicle, and/or whether, based on the ABS control parameters, it follows that further ABS control valves, which are allocated at least to one second wheel of the vehicle, implement correctly a brake slip-controlled activation.

9 Claims, 7 Drawing Sheets

(51) Int. Cl.
*B60T 8/176* (2006.01)
*B60T 8/88* (2006.01)
*B60T 15/02* (2006.01)
*B60T 17/22* (2006.01)

(52) U.S. Cl.
CPC .......... B60T 15/028 (2013.01); B60T 17/221 (2013.01); *B60T 2270/10* (2013.01); *B60T 2270/406* (2013.01); *B60T 2270/413* (2013.01)

(58) Field of Classification Search
CPC ............... B60T 17/221; B60T 2270/10; B60T 2270/406; B60T 2270/413; B60T 17/22; B60T 7/12
USPC .......................................................... 701/76
See application file for complete search history.

(56) References Cited

U.S. PATENT DOCUMENTS

| | | | |
|---|---|---|---|
| 5,862,502 A | 1/1999 | Giers | |
| 5,897,596 A * | 4/1999 | Kabune | G05B 23/0291 714/E11.017 |
| 6,009,366 A * | 12/1999 | Burkhard | B60T 8/1764 701/79 |
| 6,173,229 B1 | 1/2001 | Fennel et al. | |
| 2002/0023242 A1 * | 2/2002 | Kidokoro | B60T 8/885 714/E11.002 |
| 2014/0012463 A1 | 1/2014 | Pfaffeneder et al. | |
| 2014/0039649 A1 | 2/2014 | Wender et al. | |
| 2015/0094906 A1 * | 4/2015 | Greene | B60T 13/263 701/33.9 |

FOREIGN PATENT DOCUMENTS

| | | |
|---|---|---|
| DE | 3829949 A1 | 3/1990 |
| DE | 4137124 A1 | 5/1993 |
| DE | 4341082 A1 | 6/1995 |
| DE | 19631309 A1 | 2/1998 |
| DE | 102004009466 A1 | 9/2005 |
| EP | 0152101 A2 | 8/1985 |
| EP | 1150209 A2 | 10/2001 |
| EP | 2693278 A2 | 2/2014 |
| EP | 2726352 B1 | 5/2014 |

* cited by examiner

METHOD FOR MONITORING AN ABS CONTROL PROCEDURE IN AN ELECTRICALLY CONTROLLABLE BRAKE SYSTEM AND ELECTRONICALLY CONTROLLABLE BRAKE SYSTEM

CROSS REFERENCE TO RELATED APPLICATIONS

This application is a U.S. National Stage Application under 35 U.S.C. § 371 of International Application No. PCT/EP2017/000396 filed on Mar. 31, 2017, and claims benefit to German Patent Application No. DE 10 2016 007 149.4 filed on Jun. 10, 2016. The International Application was published in German on Dec. 14, 2017 as WO 2017/211436 A1 under PCT Article 21(2).

FIELD

The invention relates to a method for monitoring an ABS control procedure in an electrically controllable brake system of a vehicle, in particular a commercial vehicle, and an electronically controllable brake system.

BACKGROUND

It is generally known to use an ABS control procedure in vehicles, in particular commercial vehicles, which comprise an electronically controllable brake system, wherein it is possible using said ABS control procedure to decelerate the vehicle in a brake slip-controlled manner. In so doing, when an ABS brake slip incident is detected by an ABS control unit with reference to wheel rotational speed signals of a corresponding sensor, ABS control valves are actuated at the wheels at which the ABS brake slip incident has been detected. As a result, a brake pressure that is acting on wheel brakes of this wheel is correspondingly reduced or maintained in order to counteract any inclination of the respective wheels to lock. The reliability of the ABS control procedure is not monitored in this case.

In order to check the reliability of an output signal of a control unit in a vehicle, it is known according to EP 2 693 278 A2 to check or perform a plausibility check on an output signal that is determined by means of an algorithm, is critical with regard to safety aspects and is output by way of example from an emergency brake system. Thus, in the event that an output signal that is critical with regard to safety aspects is detected, said check is repeated in that redundant hardware or a redundant algorithm is used. In accordance with EP 2 726 352 B1, it is furthermore provided to check a function of a safety monitoring unit. In so doing, the output signals of the safety monitoring unit are compared in an external monitoring facility or monitoring unit with desired values with respect to content and/or time intervals. In the event of a deviation, suitable safety measures are initiated.

SUMMARY

In an embodiment, the present invention provides a method for monitoring an ABS control procedure in an electrically controllable brake system in a vehicle. The method includes reading in input signals, wherein based on the input signals it is possible to derive currently prevailing control variables for the ABS control procedure and ABS control parameters that relate to a brake slip-controlled actuation of an ABS control valve of the brake system. The method further includes checking, based on the input signals, whether it follows that an activation of any ABS control valve that is allocated to a wheel of the vehicle is requested, and based on the control variables whether it follows that an ABS brake slip incident is present at at least a first wheel of the vehicle, and/or whether, based on the ABS control parameters, it follows that further ABS control valves, which are allocated at least to one second wheel of the vehicle, implement correctly a brake slip-controlled activation. In addition, the method includes outputting a deactivation signal in dependence upon the checking in order to prevent an actuation of the ABS control valves in dependence upon the situation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide methods for monitoring an ABS control procedure in an electrically controllable brake system, with which it is possible to ensure a safe and reliable braking procedure with little effort. Further embodiments of the invention provide an electronically controllable brake system.

According to embodiments of the invention, procedures of checking or performing a plausibility check on a request for an ABS control procedure are thus provided, wherein in dependence upon this request ABS control valves of a pneumatic or hydraulic brake system are actuated. In so doing, a check is performed in particular as to whether a request in the form of a request signal is present for any ABS control valve that is allocated to a specific wheel of the vehicle, in other words whether it is requested that this ABS control valve be activated or actuated, and whether on the basis of currently determined control variables for the ABS control procedure it follows that an ABS brake slip incident is really present at at least one wheel of the vehicle, and/or whether on the basis of ABS control parameters it follows that further ABS control valves that are allocated to a further wheel of the vehicle implement or are able to implement correctly a brake slip-controlled actuation.

Consequently, the advantage is already achieved that it is possible to monitor whether an ABS control procedure is only performed when such a procedure is actually necessary and the ABS control procedure does not create any unstable driving states or the efficacy of the brake system is not reduced by erroneously actuated ABS control valves. This is because an unnecessary activation of an ABS control valve without there being an ABS brake slip incident present at any one of the wheels of the vehicle may lead to a reduction in the efficacy of the brakes and consequently create a traffic hazard or cause the driver to feel insecure or actually produce an unstable driving state if by way of example the unnecessary activation only occurs on one side. Unstable driving states may also occur if an ABS control procedure is implemented or may be implemented incorrectly on individual ABS control valves.

In dependence upon the checking procedure, a deactivating signal is output so as to deactivate an actuation of all ABS control valves in dependence upon the situation, with the result that it is possible to prevent an unreliable and unsafe actuation of the ABS control valves.

The actuation of ABS control valves is advantageously prevented if, in the presence of a request for the activation of any ABS control valve, an ABS brake slip incident is actually not present or has not been detected at at least one wheel of the vehicle. Consequently, it is possible in a simple manner even without a per wheel evaluation to detect whether an ABS control valve is activated although an ABS brake slip incident is not present at any of the wheels of the vehicle and this activation is consequently not justified.

In accordance with a specific embodiment, it is provided that it is only determined whether an ABS brake slip incident is also actually present at the wheel that is allocated to the respective ABS control valve. This per wheel evaluation may be used in the case of wheels/valves that are exclusively controlled in an individual manner and which are not actuated for example by virtue of being coupled to other wheels, such as for example in the case of a modified individual control procedure.

Furthermore, it is possible in addition or as an alternative to prevent the actuation of the ABS control valves if it has been established that one of the other ABS control valves implements or may implement incorrectly a brake slip-controlled actuation.

The statement 'by preventing or deactivating an actuation of all ABS control valves' is understood in this case to mean that either control signals are prevented from being transmitted to the ABS control valves or that ABS control valves themselves are deactivated and consequently are no longer able to change their state. Influencing a brake pressure controlled by a brake slip is consequently no longer possible at least via the ABS control valves.

Consequently, methods in accordance with embodiments of the invention react to an incorrect ABS control procedure being detected by preventing the actuation of all ABS control valves. As a result, it is ensured that an actuation of the ABS control valves does not lead to the vehicle becoming unstable, to the driver feeling insecure or to a reduced efficacy of the brake system.

The checking as to whether in the case of an ABS control valve being activated a correct implementation is present at a further ABS control valve, is advantageously performed in a per axle manner. In other words, in the case of an ABS control valve being activated, preferably an ABS control valve on a front axle of the vehicle, a check is performed as to whether other ABS control valves on another vehicle axle, preferably on a rear axle of the vehicle, are functioning correctly. In the event that one of the other ABS control valves on the rear axle, which is actuated in a brake slip-controlled manner, is not functioning correctly, it is possible for the vehicle to swerve if simultaneously the ABS control valve on the front axle is actuated in a brake slip-controlled manner. Consequently, a corresponding deactivation signal is output in this case with the result that the activation of all ABS control valves of the vehicle is prevented.

During the checking procedure, a wheel speed or a wheel slip or a wheel circumferential acceleration are understood to be control variables, in dependence of which it is possible to detect an ABS brake slip incident. These control variables are produced by way of example on the basis of the wheel rotational speed signals of a wheel rotational speed sensor on the respective wheel. The ABS control parameters indicate in particular whether a brake slip-controlled request has been output via a control signal to an ABS control valve by the ABS control procedure or by an ABS control unit that controls this ABS control procedure and whether the corresponding ABS control valve implements the requests correctly and in full.

The term 'ABS brake slip incident' is understood to mean that it follows on the basis of the control variables for a wheel that is allocated to the respective ABS control valve that said wheel is inclined to become locked. For this purpose, it is possible by way of example to compare the wheel speed with a reference speed of the vehicle and in the event of a deviation by a specific difference speed to conclude the presence of an excessively high amount of brake slippage and consequently to conclude the presence of an ABS brake slip incident. Furthermore, it is also possible in the case of an excessively high wheel circumference acceleration to conclude an excessively high amount of brake slippage and consequently to conclude the presence of an ABS brake slip incident.

It is preferred that it is possible during the checking procedure to also take into consideration a run-on period of time that may amount by way of example to 2000 ms. The run-on period of time is employed after the elimination of a previously detected ABS brake slip incident at any wheel of the vehicle. If therefore by way of example on account of the ABS control procedure a previously detected ABS brake slip incident no longer exists at one point in time, a deactivating signal is only output thereafter at the end of the run-on time period if any one of the ABS control valves is still actuated then. This has the advantage that delays in receiving a signal and/or processing a signal or may be final valve control procedures after a correct ABS control procedure do not lead incorrectly to the actuation of the ABS control valves being deactivated.

Furthermore, it is preferred that during the monitoring a tolerance time period may be taken into consideration that may amount by way of example to 50 ms. The tolerance time is applied after it is detected that an ABS control valve is actuated or after an incorrect actuation of a further ABS control valve is detected. Thus, if no ABS brake slip incident is detected for any wheel of the vehicle within the tolerance period of time in the case of an activated ABS control valve or if the ABS control valve is activated within the tolerance period of time after it is detected that a further ABS control valve is incorrectly actuated, a request to the ABS control valves is prevented via the deactivating signal.

As a result of that, too, signal processing and transmitting delays can advantageously be taken into consideration.

The run-on period of time and/or the tolerance period of time may however also be omitted or set to 0 ms if by way of example it is possible to ensure a safe and reliable transmission with little time lost. Accordingly, when an ABS control valve is actuated, a check is always simultaneously performed as to whether an ABS brake slip incident is present and/or a further ABS control valve implements correctly the brake slip-controlled actuation.

In accordance with embodiments of the invention, a method is performed in a monitoring unit of an electronically controlled pneumatic or hydraulic brake system having an ABS control unit. The ABS control procedure is controlled in the ABS control unit and in dependence thereon the ABS control parameters are output to the monitoring unit, wherein the ABS control parameters indicate whether and at which level of reliability the corresponding ABS control valves may be actuated. Furthermore, wheel rotational speed signals are transmitted to the monitoring unit preferably direct from the wheel rotational speed sensors or else from the ABS control unit and it is possible to derive the control variables from said wheel rotational speed signals.

Consequently, input signals are read in by the monitoring unit, said input signals being further processed internally via signals, in that temporal signal progressions are set up for these internal signals. With reference to these temporal progressions, a method in accordance with an embodiment of the invention is performed so as to check or perform a plausibility check as to whether the requirements with respect to the safety and reliability are fulfilled. If the monitoring unit concludes that the ABS control procedure is unsafe or unreliable, the deactivating signal is output preferably to the ABS control unit that then prevents a further actuation of all the ABS control valves of the vehicle.

Figure 1A:
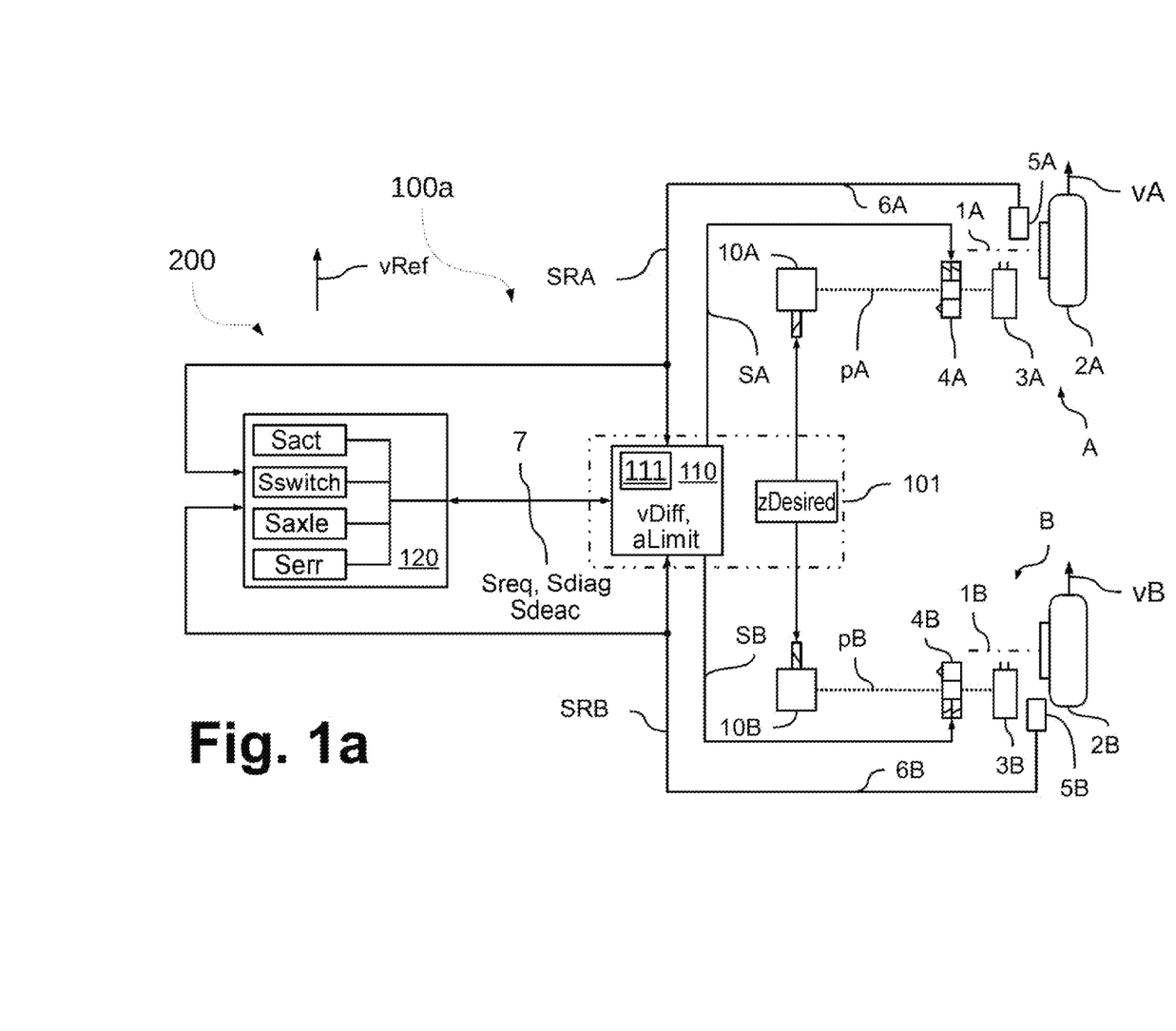
FIGS. 1a and 1b illustrate brake systems in accordance with embodiments of the invention as a block diagram.

FIG. 1a illustrates a section of a pneumatic brake system 100a of a vehicle 200 as a block diagram showing the components that are essential here, said brake system being controlled in an electronic manner via a control unit 101 in order to implement a requested vehicle target deceleration zTarg.

The vehicle 200 comprises two vehicle axles 1A, 1B on which are arranged wheels 2A, 2B respectively, wherein for the sake of the overview only one wheel 2A, 2B per vehicle axle 1A, 1B is illustrated. The wheels of the vehicle 200 that are not illustrated are configured in a corresponding manner. The wheels 2A, 2B may be braked in two independent brake circuits A, B via wheel brakes 3A, 3B, wherein in order to realize the vehicle target deceleration zTarg the respective wheel brake 3A, 3B is provided with a brake pressure pA, pB via a relay valve 10A, 10B that is controlled by the control unit 101.

In order to be able to react to an ABS brake slip incident, an ABS control valve 4A, 4B is allocated to each wheel 2A, 2B, which control valve is actuated or activated, in the event that the ABS control unit 110 has detected an ABS brake slip incident, via control signals SA, SB by an ABS control unit 110 that is integrated in the control unit 101. The ABS control valves 4A, 4B each comprise an inlet valve and an outlet valve with the result that in the usual manner a brake pressure pA, pB that is present at the wheel brakes 3A, 3B may be reduced or maintained in order to react to the detected ABS brake slip incident in a corresponding manner.

In order to detect an ABS brake slip incident, wheel rotational speed sensors 5A, 5B are allocated to each wheel and on the basis of the wheel rotational speed signals SRA, SRB that are output by said wheel rotational speed sensors the ABS control unit 110 may determine by way of example a wheel speed vA, vB and/or a wheel circumference acceleration aA, aB of the respective wheel 2A, 2B. An ABS brake slip incident is present by way of example if the wheel speed vA, vB is less than a reference speed vRef of the vehicle 200 by a speed difference vDiff, in other words if a brake slippage of the respective wheel 2A, 2B is too high and/or the wheel circumference acceleration aA, aB exceeds an acceleration limit value aLimit. It is possible to conclude from this whether one of the wheels 2A, 2B is inclined to lock during a braking procedure.

The ABS control unit 110 comprises furthermore a diagnostic unit 111 in which a check is performed as to whether the actuation of the ABS control valves 4A, 4B is implemented or may be implemented correctly. Accordingly, a check is performed as to whether an actual-state with regard to the actuation of the respective ABS control valve 4A, 4B matches a desired-state that is predetermined by means of the corresponding control signal SA, SB, in other words a request for the activation of an ABS control valve 4A, 4B is also actually implemented correctly by means of the ABS control unit 110. The result is output accordingly in a per wheel diagnostic signal Sdiag.

Figure 1B:
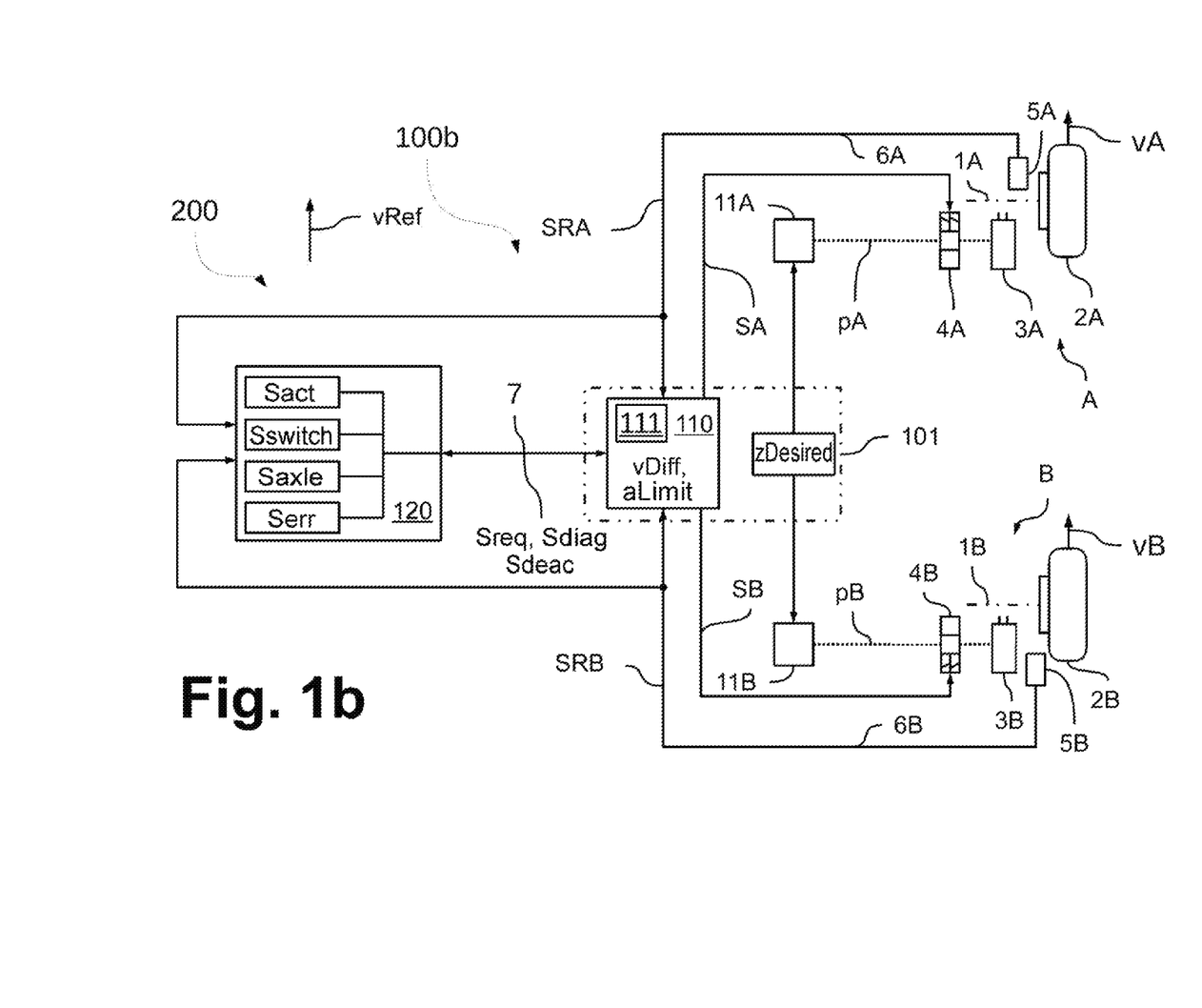

Alternatively, as illustrated in FIG. 1b, it is possible to provide a hydraulic brake system 100b that is constructed in a corresponding manner and provides a hydraulic fluid at a determined brake pressure pA, pB. In contrast to a pneumatic brake system 100a, the relay valves 10A, 10B are omitted in this case and are replaced by brake pressure generators 11A, 11B that ensure that the hydraulic fluid is supplied to the ABS control valves 4A, 4B at a brake pressure pA, pB that is required to implement the vehicle target deceleration zTarg.

In order to ensure a safe and reliable operation of the hydraulic and the pneumatic brake system 100a, 100b, in particular of the ABS control procedure, a monitoring unit 120 is furthermore provided that monitors the operation of the ABS control unit 110 or checks or performs a plausibility check on the requests output by the ABS control unit 110. For this purpose, the monitoring unit 120 is connected to sensor lines 6A, 6B via which the wheel rotational speed signals SRA, SRB are transmitted from the wheel rotational speed sensors 5A, 5B to the ABS control unit 110. As a consequence, the monitoring unit 120—in the same manner as the ABS control unit 110—can detect an ABS brake slip incident on the basis of the wheel rotational speed signals SRA, SRB.

Furthermore, the monitoring unit 120 is connected to the ABS control unit 110 via a data line 7. A request signal Sreq notifies the monitoring unit 120 via the data line 7 whether the ABS control unit 110 requests the activation of an ABS control valve 4A, 4B and which ABS control valve 4A, 4B is thus to be activated. Moreover, the per wheel diagnostic signal Sdiag is transmitted to the monitoring unit 120 via the data line 7.

In addition, a deactivating signal Sdeac may be transmitted by the monitoring unit 120 to the ABS control unit 110 via the data line 7. In dependence upon this deactivating signal Sdeac, a deactivation of the actuation of all ABS control valves 4A, 4B may be requested. This is performed in accordance with this embodiment by the ABS control unit 110, wherein in the event of a deactivation being requested an actuation or activation of all ABS control valves 4A, 4B is prevented.

Consequently, the monitoring unit 120 is provided with a series of input signals SRA, SRB, Sreq, Sdiag on the basis of which it is possible to derive currently prevailing control variables vA, vB, aA, aB for the ABS control procedure and also ABS control parameters Sreq, Sdiag that relate to an actuation of a respective ABS control valve 4A, 4B. With reference to these input signals SRA, SRB, Sreq, Sdiag, the monitoring unit 120 performs a check as follows as to whether a safe and reliable ABS control procedure is implemented by means of the respective brake system 100a, 100b. For this purpose, the following signals are processed internally in the monitoring unit 120:

An activating signal Sact indicates whether on the basis of the wheel rotational speed signals SRA, SRB of any wheel 2A, 2B it follows that an ABS brake slip incident is present, wherein a parallel check is also performed in the ABS control unit 110. If the wheel rotational speed signals SRA, SRB indicate an ABS brake slip incident is present at any wheel 2A, 2B, the activation signal Sact takes on the value "1" or "true". If on the basis of the wheel rotational speed signals SRA, SRB it follows that an ABS brake slip incident is not (no longer) present at any of the wheels 2A, 2B, the activation signal Sact takes on the value "0" or "false". The activation signal Sact may consequently alternate between the two values "0" and "1" or "false" and "true".

A further internal run-on signal Srun-on reproduces essentially the activation signal Sact with the difference that the value of the run-on signal Srun-on remains unchanged after the activation signal Sact is switched from "1" to "0" or from "true" to false" over a run-on time period dt1 of by way of example 2000 ms, in other words the value "1" or "true" is still maintained for this run-on time period dt1. Consequently, the run-on signal Srun-on only changes its value from "1" to "0" somewhat delayed in comparison to the activation signal Sact.

A further internal switching signal Sswitch indicates whether the ABS control unit 110 outputs via the control signals SA, SB a request for the actuation or activation of any ABS control valve 4A, 4B irrespective of whether an ABS brake slip incident is actually present or not. This information is obtained on the basis of the request signal Sreq.

An additional axle signal Saxle indicates whether there is a request to actuate or activate one or multiple ABS control valves 4A, 4B on a specific vehicle axle 1A, 1B, by way of example a front axle. This also results from the request signal Sreq since said request signal also transmits which ABS control valve 4A, 4B is to be actuated by the ABS control unit 110 via the respective control signal SA, SB.

A further internal error signal Serr indicates whether on the basis of the diagnostic signal Sdiag it has been detected that an error has occurred during the implementation at one or multiple ABS control valves 4A, 4B on a vehicle axle, by way of example on a rear axle of the vehicle 200.

The internal activation signal Sact, the run-on signal Srun-on and also the switching signal Sswitch are generated in accordance with this exemplary embodiment per vehicle, in other words said signals indicate whether an ABS brake slip incident is present at any wheel 2A, 2B of the vehicle 200 or whether any ABS control valve 4A, 4B is currently being actuated or activated. As a consequence, it can be checked per vehicle as to whether the ABS functionality of the respective brake system 100a, 100b is implemented or may be implemented in a safe and reliable manner. In contrast, the axle signal Saxle and the error signal Serr are generated in a per axle manner, in other words if the corresponding event is detected at at least one of the ABS control valves 4A, 4B of this vehicle axle 1A, 1B, a corresponding value of the internal signal Saxle, Serr is adjusted.

If, based on the per vehicle and/or per axle internal signals Sact, Srun-on, Sswitch, Saxle, Serr an incorrect or safety-critical implementation occurs, the deactivation signal Sdeact is output with the value "true" via the data line 7 to the ABS control unit 110 that—despite the presence of a request via the control signals SA, SB—subsequently prevents an actual activation or actuation of all the ABS control valves 4A, 4B.

For this, in accordance with a first, comparatively simple embodiment, a check is performed as to whether an activation of any ABS control valve 4A, 4B by means of the ABS control unit 110 is only performed if an ABS brake slip incident is detected at any wheel 2A, 2B of the vehicle 200. In accordance with a second, more complex embodiment, however, it is also possible to perform a check as to whether an activation of any ABS control valve 4A, 4B by means of the ABS control unit 110 is only performed if an ABS brake slip incident has also been detected for the wheel 2A, 2B that has been allocated to this ABS control valve 4A, 4B.

By way of example, FIGS. 2a to 2d illustrate the internal signals Sact, Srun-on and Sswitch and also the deactivating signal Sdeac as functions of time.

Figure 2A:
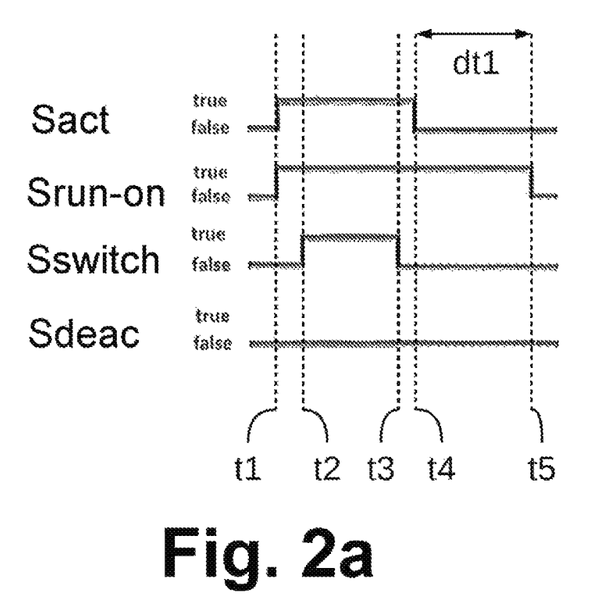
FIGS. 2a, 2b, 2c and 2d illustrate temporal signal progressions in accordance with a first embodiment of the invention.

In accordance with FIG. 2a, it is concluded at a first point in time t1 via the internal activation signal Sact that an ABS brake slip incident is present at any wheel 2A, 2B, following which said activation signal takes on the value "true". The run-on signal Srun-on also automatically takes on the value "true" at this point in time t1. At a second point in time t2, the switching signal Sswitch takes on the value "true", in other words the ABS control unit 110 has requested an activation of an ABS control valve 4A, 4B. At a third point in time t3, the corresponding ABS control valve 4A, 4B is deactivated again by the ABS control unit 110, as a result of which the value of the switching signal Sswitch changes to "false". At a fourth point in time t4, it is detected from the wheel rotational speed signals SRA, SRB that an ABS brake slip incident is no longer present at any wheel 2A, 2B, in other words the activation signal Sact takes on the value "false". At a fifth point in time t5, the run-on signal Srun-on also takes on the value "false", wherein the run-on time period dt1 has elapsed between the fourth point in time t4 and the fifth point in time t5.

Figure 2B:
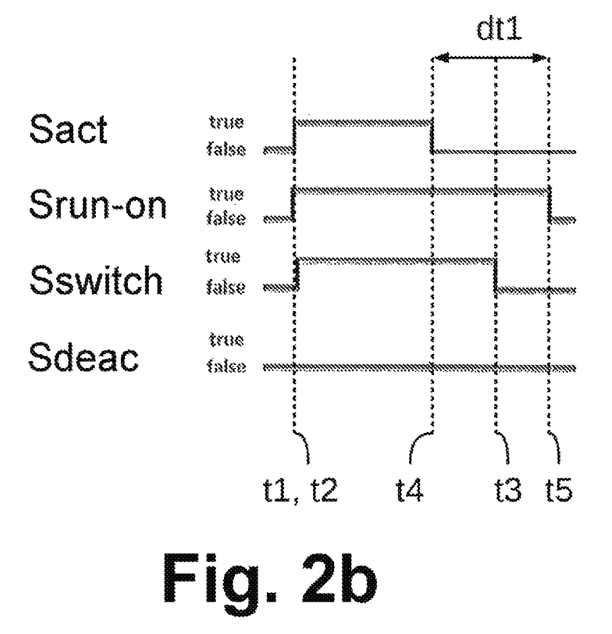

FIG. 2b illustrates a further temporal progression in which the deactivation of the corresponding ABS control valve 4A, 4B is performed at the third point in time t3 no earlier than within the run-on time period dt1. The third point in time t3 is consequently displaced to later with respect to the FIG. 2a.

FIGS. 2a and 2b consequently illustrate signal sequences of a correctly functioning ABS function since an activation of an ABS control valve 4A, 4B occurs (t2) after an ABS brake slip incident has been detected by the ABS control unit 110 (t1). If an ABS brake slip incident is no longer present (t3, t4), a deactivation of the ABS control valve 4A, 4B is requested or the request for activation is rescinded. The monitoring unit 120 will consequently conclude from the waveforms of the internal signals Sact, Srun-on, Sswitch illustrated in FIGS. 2a and 2b at all points in time t1, t2, t3, t4, t5 that no error has occurred in the actuation of the ABS control valves 4A, 4B. Therefore, a deactivation signal Sdeact having the value "false" is output over the entire period of time to the ABS control unit 110 that consequently allows an actuation of the ABS control valves 4A, 4B by means of the respective control signal SA, SB.

Figure 2C:
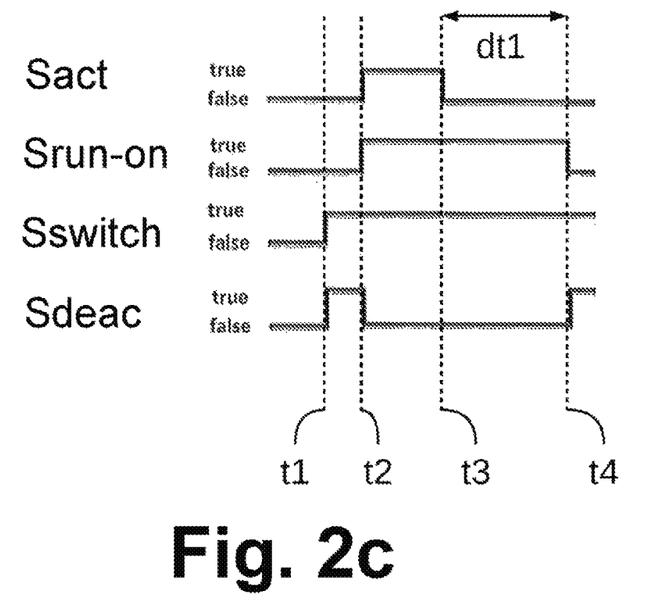

If in contrast—as illustrated by way of example in FIG. 2c—it is established during the check or plausibility check that an error has occurred, a deactivation signal Sdeac having a value "true" is output to the ABS control unit 110, following which, despite the presence of a request, an activation of all ABS control valves 4A, 4B is deactivated or prevented by means of the ABS control unit 110. In other words, a request via the control signals SA, SB to activate the corresponding ABS control valves 4A, 4B is not implemented. This procedure of preventing the activation of the ABS control valves 4A, 4B by means of the ABS control unit 110 is performed until the monitoring unit 120 determines plausible signals Sact, Srun-on, Sswitch again and consequently outputs a deactivating signal Sdeac that has the value "true".

In accordance with FIG. 2c, a request for the activation of any ABS control valve 4A, 4B is thus established via the switching signal Sswitch at a first point in time t1 although both the activation signal Sact and also the run-on signal Srun-on have the value "false", in other words an ABS brake slip incident has not been detected at any wheel 2A, 2B of the vehicle 200 and also the run-on time period dt1 is not relevant. The monitoring unit 120 therefore concludes in this example that the activation of the corresponding ABS control valve 4A, 4B has been requested on account of an error, by way of example a software error in the ABS control unit 110. The deactivation signal Sdeac therefore takes on the value "true", following which the actual implementation of the control signals SA, SB is prevented by means of deactivating all the ABS control valves 4A, 4B.

Since the ABS control unit 110 in FIG. 2c—for whatever reason—still generates a request for the activation of the corresponding ABS control valve 4A, 4B, the internal switching signal Sswitch continues to have the value "true", even if on account of the deactivation signal Sdeac="true" an actual activation of all the ABS control valves 4A, 4B is suppressed.

At a subsequent second point in time t2, the activation signal Sact and also the run-on signal Srun-on take on the value "true", in other words again an ABS brake slip incident has been detected at any wheel 2A, 2B. At this point in time, the requested activation of the corresponding ABS control valve 4A, 4B is no longer based on an error but rather on the positive detection of an ABS brake slip incident with the result that the deactivation signal Sdeac at this second point in time t2 takes on the value "false" again and an activation of the ABS control valves 4A, 4B via the control signals SA, SB is then allowed. However, at the end of the run-on time period dt1 at a fourth point in time t4, the switching signal Sswitch still has the value "true" with the result that it is again possible to conclude an error has occurred: the deactivation signal Sdeac takes on the value "true" and an activation of all ABS control valves 4A, 4B is prevented.

Figure 2D:
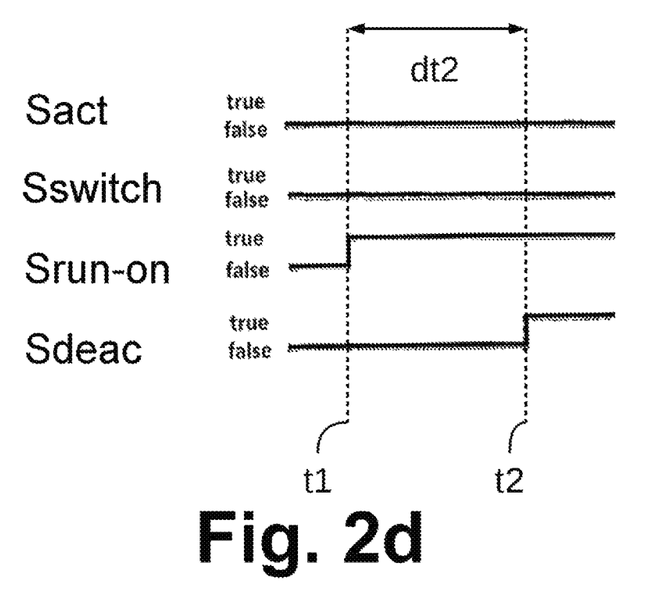

In addition, in accordance with FIG. 2d, a fixed tolerance time period dt2 of by way of example 50 ms elapses prior to switching the deactivation signal Sdeac from the value "false" to "true" after an error has been detected at a first point in time t1. In other words, an activation of the ABS control valves 4A, 4B is only prevented if it is established via the run-on signal Srun-on that an ABS brake slip incident is also not present at the end of this tolerance period of time dt2, in other words the run-on signal Srun-on does not take on the value "true" even at the end of the tolerance time period dt2 at a second point in time t2. This means for FIG. 2c that: in the event that additionally a tolerance time period dt2 is taken into consideration and the time period between the first point in time t1 and the second point in time t2 is shorter than the tolerance time period dt2, the deactivation signal Sdeac in FIG. 2c remains at the value "false" between the first point in time t1 and the second point in time t2.

By taking into consideration the tolerance time period dt2, it is possible to include delays in the signal transmission to the monitoring unit 120 and a subsequent delay in the determination of the run-on signal Srun-on. Depending upon the brake system 100a, 100b, it is also possible to apply a shorter tolerance time period dt2.

In accordance with a further embodiment that is illustrated in FIGS. 3a to 3e, a check is performed by the monitoring unit 120 in a per axle manner as to whether an activation of the ABS control valves 4A, 4B has been correctly performed with respect to safety aspects. In the following, for this purpose, the brake circuit A together with its corresponding components is allocated to the rear axle and the brake circuit B together with its corresponding components is allocated to the front axle of the vehicle 200.

For the checking procedure, the value of the per axle error signal Serr is established in dependence upon the diagnostic signal Sdiag in such a manner that the error signal Serr takes on the value "true" if at least one of the ABS control valves 4A of the rear axle 1A is not correctly actuated or said valve does not fully implement the requests. It is simultaneously queried via the axle signal Saxle whether an activation of an ABS control valve 4B is present on the front axle 1B.

Figure 3A:
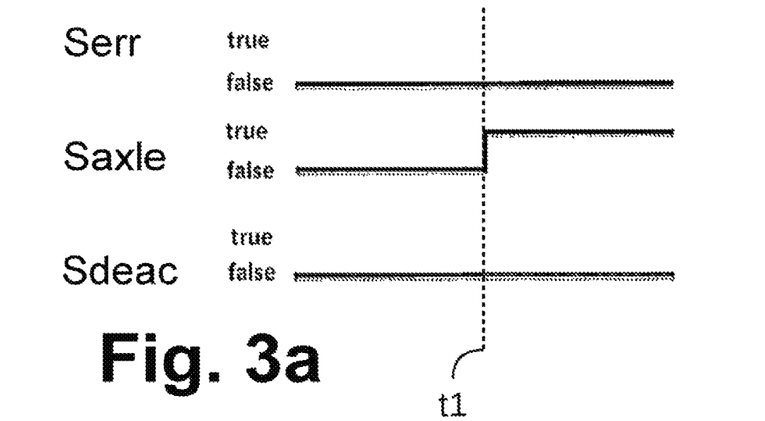
FIGS. 3a, 3b, 3c, 3d, and 3e illustrate temporal signal progressions in accordance with a further embodiment of the invention.

In accordance with FIG. 3a, the case is illustrated that the error signal Serr takes on the value "false" over the entire signal sequence, in other words the ABS control valves 4A of the rear axle 1A are functioning correctly. A requested activation of an ABS control valve 4B on the front axle 1B at a first point in time t1 that is indicated via the switching signal Sswitch="true" is consequently allowed: the deactivation signal Sdeac has the value "false" over the entire signal sequence.

Figure 3B:
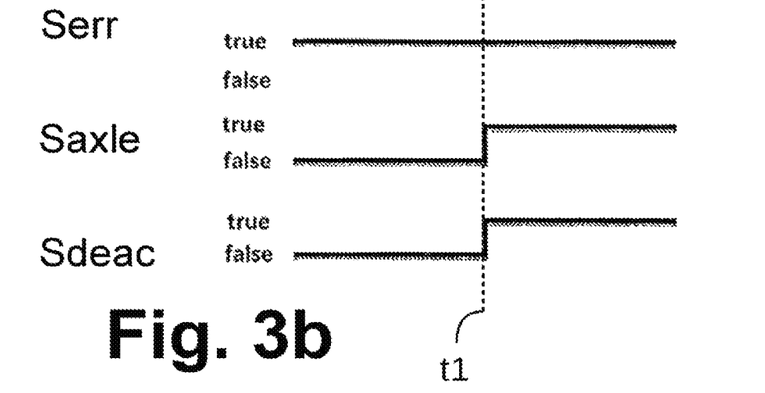

In contrast in accordance with FIG. 3b, the error signal Serr has the value "true" over the entire signal sequence, in other words one of the ABS control valves 4A of the rear axle 1A does not implement the request correctly. An ABS control valve 4B of the front axle 1B is subsequently activated at a first point in time t1. This may lead to the vehicle 200 becoming unstable since only the front axle 1B is being braked in a brake slip-controlled manner. It is therefore provided that the ABS control is prevented: the deactivation signal Sdeac takes on the value "true" at the first point in time t1, a request via the control signal SB is no longer implemented by the ABS control valves 4B of the front axle 1B.

Figure 3C:
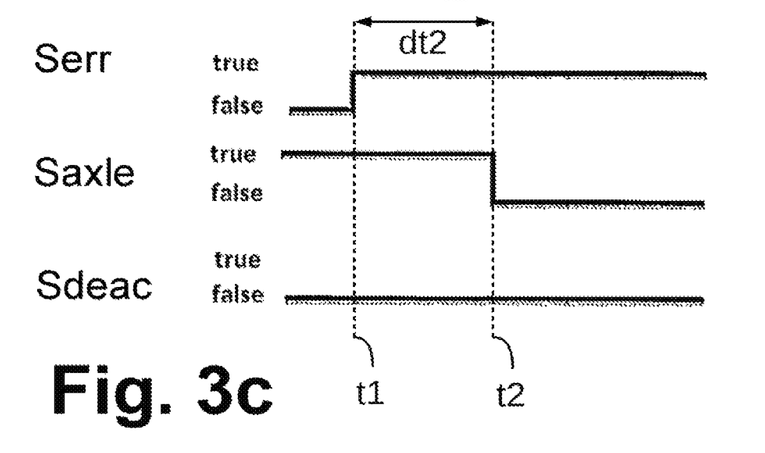

In accordance with FIG. 3c, the tolerance time period dt2 is additionally taken into consideration in order to take into account signal delays. Accordingly, the error signal Serr takes on the value "true" at a first point in time t1, in other words one of the ABS control valves 4A of the rear axle 1A does not implement the request correctly. There is simultaneously a request for the activation of an ABS control valve 4B on the front axle 1B, in other words Saxle="true", said request being rescinded however at a second point in time t2, in other words Saxle="false". Since the switch over occurs within the tolerance time period dt2, a possible signal delay is taken into consideration without—on account of the short tolerance time period dt2—having to accept the vehicle 200 becoming unstable.

Figure 3D:
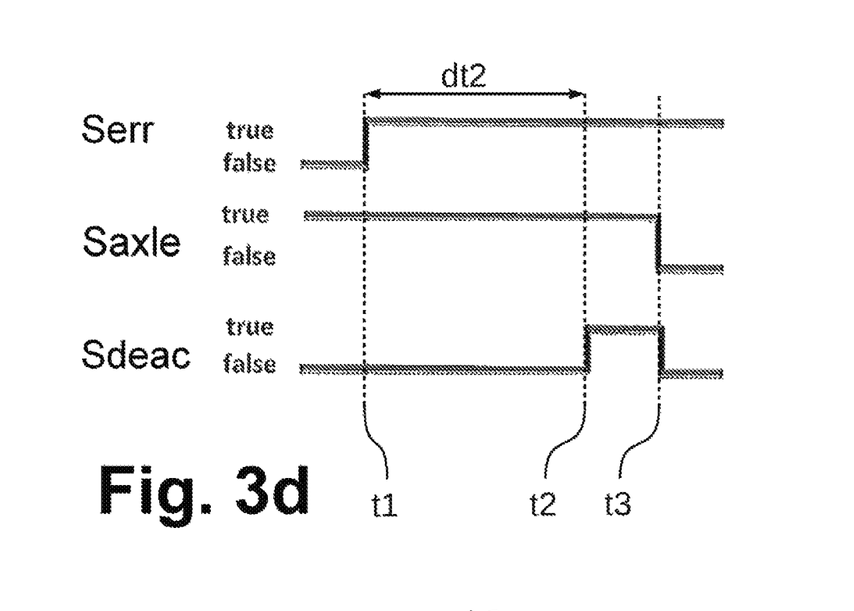

In accordance with the signal sequence in FIG. 3d, the error signal Serr takes on the value "true" at a first point in time t1, in other words one of the ABS control valves 4A of the rear axle 1A implements the request incorrectly. There is simultaneously a request for the activation of an ABS control valve 4B on the front axle 1B, in other words Saxle="true", said request only being rescinded at a third point in time t3 after the tolerance time period dt2, in other words Saxle="false". After the tolerance time period dt2 has elapsed, at a second point in time t2, the deactivation signal Sdeac is therefore set to "true" and an actual activation of the ABS control valve 4B of the front axle 1B is prevented in order not to risk an unstable driving state. At the third point in time t3, the deactivation signal Sdeac is set to "false" since Saxle also takes on the value "false".

Figure 3E:
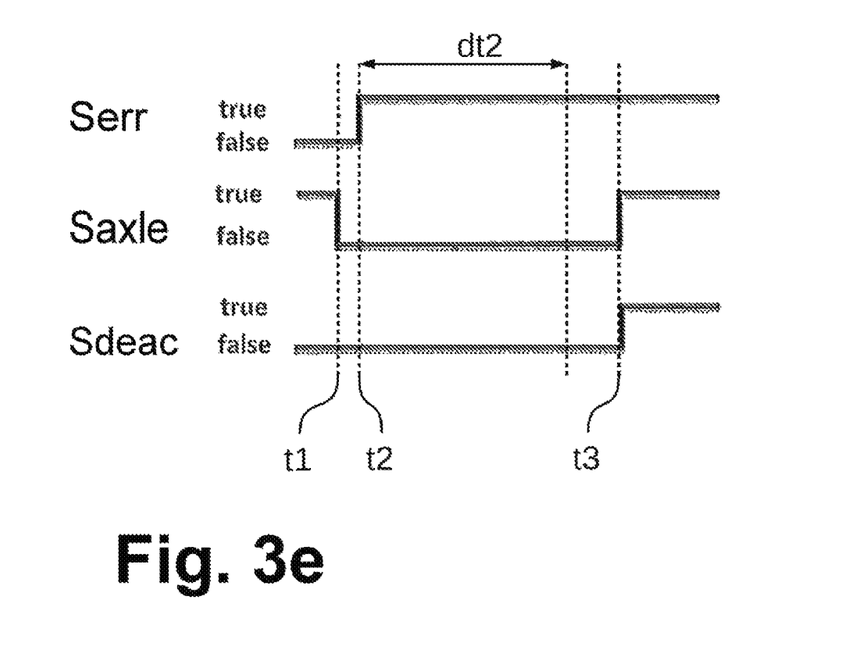

In accordance with FIG. 3e, a further signal sequence is illustrated according to which at a first point in time t1a request for the activation of one of the ABS control valves 4B on the front axle 1B is rescinded. At a second point in time t2, the error signal Serr takes on the value "true", in other words one of the ABS control valves 4A of the rear axle 1A implements the request incorrectly. After the tolerance time period dt2 has elapsed, at a third point in time t3 there is a request for the activation of one of the ABS control valves 4B of the front axle 1B. Since the tolerance time period dt2 has already elapsed, the deactivation signal Sdeac is set to "true" in order not to risk any unstable driving states.

It is consequently possible in different embodiments that may be implemented alternatively or sequentially to ensure a safe and reliable operation of the ABS control procedure in that the internal signals Sact, Srun-on, Sswitch, Saxle, Serr are correspondingly checked or checked for plausibility and upon an error being detected an activation of all ABS control valves 4A, 4B is prevented via the deactivation signal Sdeac.

Figure 4:
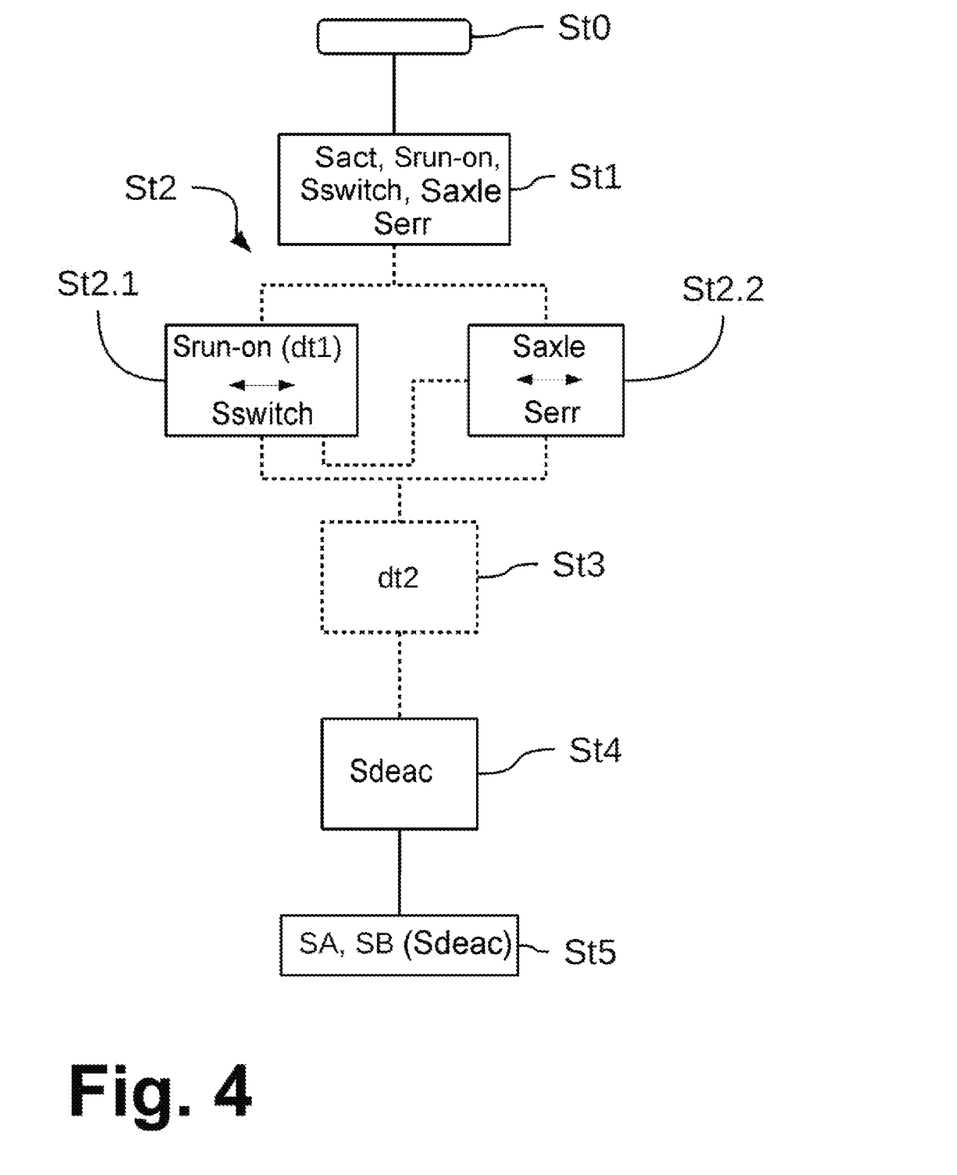
FIG. 4 illustrates a flow chart for performing a method according to an embodiment of the invention.

The method in accordance with an embodiment the invention may proceed for this purpose by way of example as follows:

The monitoring procedure is initially initiated in a start step St0.

Subsequently in a first step St1, the per axle and/or per vehicle internal signals Sact, Srun-on, Sswitch, Saxle, Serr are determined in the monitoring unit 120 according to the above-mentioned principles based on the input signals SRA, SRB, Sdiag, Sreq, wherein it is possible based on the input signals SRA, SRB, Sdiag, Sreq to derive the currently prevailing control variables vA, vB, aA, aB for the ABS control procedure and ABS control parameters Sreq, Sdiag that relate to an actuation of an ABS control valve 4A, 4B.

For this purpose, the per vehicle activation signal Sact, which indicates the presence of an ABS brake slip incident at any wheel 2A, 2B, the per vehicle run-on signal Srun-on and the per vehicle switching signal Sswitch, which indicates a request for the activation of any ABS control valve 4A, 4B, are generated in dependence upon the wheel rotational speed signals SRA, SRB, the diagnostic signal Sdiag and the request signal Sreq. Furthermore the per axle signal Saxle and the per axle error signal Serr are generated on this basis.

In a subsequent second step St2, a check is performed on the basis of the internal signals Sact, Srun-on, Sswitch, Saxle, Serr as to whether the ABS functionality of the respective brake system 100a, 100b is implemented in a safe and reliable manner:

For this purpose, a check is performed in a first part step St2.1 via the per vehicle activation signal Sact or the per vehicle run-on signal Srun-on, in other words taking into consideration a run-on time period dt1, as to whether a request for the activation of an ABS control valve 4A, 4B is only provided by the ABS control unit 110 if an ABS brake slip incident is also present at any wheel 2A, 2B of the vehicle 200. In other words, a check is performed as to whether the run-on signal Srun-on has the value "true" if the value "true" has been determined for the switching signal Sswitch. For this purpose, it is possible in an optional third step St3 to additionally take into consideration a tolerance time period dt2 in order to include the signal delays.

In a second part step St2.2 that may occur after or prior to the first part step St2.1 or alternatively to the first part step St2.1, a check is performed with reference to the per axle axle signal Saxle and the error signal Serr as to whether an activation of an ABS control valve 4B has been requested at the front axle 1B, whereas at least one ABS control valve 4A on the rear axle 1A is functioning incorrectly. Accordingly, a check is performed as to whether the error signal Serr has the value "false" if the value "true" has been determined for the axle signal Saxle. It is also possible here in the optional third step St3 to additionally take into consideration a tolerance period of time dt2 in order to include signal delays.

If it is detected in the first part step 2.1—where appropriate by taking into consideration the tolerance time period dt2 in the third step St3—that the switching signal Sswitch takes on the value "true" but that the run-on signal Srun-on takes on the value "false", the deactivation signal Sdeac is set to the value "true" in a fourth step St4; an activation of all the ABS control valves 4A, 4B is prevented. This also applies if in the second part step St2.2—where appropriate by taking into consideration the tolerance time period dt2 in the third step St3—it has been detected that the axle signal Saxle has the value "true" and simultaneously also the error signal Serr takes on the value "true".

In all other cases, the deactivation signal Sdeac takes on the value "false" and the corresponding ABS control valve 4A, 4B may be actuated in the normal manner.

In a fifth step St5, the ABS control valves 4A, 4B are activated or not activated via the control signals SA, SB depending upon whether the deactivation signal has the value "true" or "false" in order to be able to react to a detected ABS brake slip incident.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1A, 1B, Vehicle axles
2A, 2B Wheels
3A, 3B Wheel brakes
4A, 4B ABS control valve
5A, 5B Wheel rotational speed sensors
6A, 6B Sensor lines
7 Data line
10A, 10B Relay valve
11A, 11B Brake pressure generator 100a pneumatic brake system
100b hydraulic brake system
101 Control unit
110 ABS control unit
111 Diagnostic unit
120 Monitoring unit
200 Vehicle
A, B Brake circuit
aA, aB Wheel circumference acceleration
aLimit Acceleration limit value
dt1 Run-on time period
dt2 Tolerance time period
pA, pB Brake pressures
SA, SB Control signals
Saxle Axle signal
Sact Activation signal
Sdeac Deactivation signal
Sdiag Diagnostic signal
Serr Error signal
Srun-on Run-on signal
SRA, SRB Wheel rotational speed signals
Sswitch Switching signal
t1, t2, t3, t4, t5 Points in time
vA, vB Wheel speed
vDiff Difference speed
vRef Reference speed
zTarg Vehicle target deceleration
St0, St1, St2, Method Steps
(St2.1, St2.2),
St3, St4, St5

The invention claimed is:

1. A method for monitoring an ABS control procedure in an electrically controllable brake system in a vehicle, the method comprising:
reading in input signals, wherein based on the input signals it is possible to derive currently prevailing control variables for the ABS control procedure and ABS control parameters that relate to a brake slip-controlled actuation of an ABS control valve of the brake system;
checking, based on the input signals, whether it follows that an activation of any ABS control valve that is allocated to a wheel of a plurality of wheels of the vehicle is requested, and based on the control variables whether it follows that an ABS brake slip incident is present at at least a first wheel of the vehicle, and/or whether, based on the ABS control parameters, it follows that further ABS control valves, which are allocated at least to one second wheel of the vehicle, implement correctly a brake slip-controlled activation; and
outputting a deactivation signal in dependence upon the checking in order to prevent an actuation of the ABS control valves in dependence upon the situation, wherein:
an actuation of the ABS control valves is prevented if an activation of any ABS control valve is requested and an ABS brake slip incident has not been detected at at least one of the wheels of the vehicle, and
during the checking, a tolerance time period is taken into consideration, wherein an actuation of the ABS control valve is only prevented if:
after the actuation of any ABS control valve and after the tolerance time period has elapsed an ABS brake slip incident has not been detected at at least one wheel of the vehicle, and/or
the activation of any ABS control valve is maintained after an incorrect implementation of a further ABS control valve has been detected and the tolerance time period has elapsed.

2. The method as claimed in claim 1, wherein during the checking a run-on time period is taken into consideration, wherein an actuation of the ABS control valves is only prevented if after the elimination of an ABS brake slip incident at at least one of the wheels and after the run-on time period has elapsed an activation of any ABS control valve is requested.

3. The method as claimed in claim 1, wherein an actuation of the ABS control valve is prevented if an activation of any ABS control valve on the first wheel of the vehicle is requested and a further ABS control valve on the at least one second wheel of the vehicle implements incorrectly a brake slip-controlled actuation.

4. The method as claimed in claim 1, wherein the first wheel is arranged on a first axle of the vehicle and the at least one second wheel is arranged on a second axle of the vehicle with the result that a per axle check is performed.

5. The method as claimed in claim 1, wherein a check is performed as to whether, based on the input signals, it follows that an activation of any ABS control valve that is allocated to a wheel of the vehicle is requested and whether based on the control variables it follows that an ABS brake slip incident is present at the wheel of the vehicle that is allocated to the actuated ABS control valve.

6. An electronically controllable brake system, comprising: ABS control valves configured to brake wheels of a vehicle axle in a brake slip-controlled manner, an ABS control unit for controlling an ABS control procedure, a monitoring unit for performing the checking procedure, wherein the monitoring unit is configured to read in input signals, wherein it is possible based on the input signals to derive currently prevailing control variables for the ABS control procedure and ABS control parameters relate to a brake slip-controlled actuation of an ABS control valve of the brake system, and to generate and output a deactivation signal in dependence upon the checking procedure, wherein:
an actuation of the ABS control valves is prevented if an activation of any ABS control valve is requested and an ABS brake slip incident has not been detected at at least one of the wheels of the vehicle, and during the checking procedure, a tolerance time period is taken into consideration, wherein an actuation of the ABS control valve is only prevented if: after the actuation of any ABS control valve and after the tolerance time period has elapsed an ABS brake slip incident has not been detected at at least one wheel of the vehicle, and/or the activation of any ABS control valve is maintained after an incorrect implementation of a further ABS control valve has been detected and the tolerance time period has elapsed.

7. The electronically controllable brake system as claimed in claim 6, wherein it is possible in the monitoring unit based on the input signals to determine internal signals in dependence of which it is possible to perform the checking procedure, wherein
an activation signal indicates whether an ABS brake slip incident is present at at least one wheel of the vehicle,
a run-on signal takes into consideration a run-on time period after the elimination of an ABS brake slip incident at at least one wheel of the vehicle,
a switching signal indicates an actuation for the activation of any one ABS control valve of the vehicle,
an axle signal indicates a per axle actuation so as to activate the ABS control valves, and an error signal indicates in a per axle manner whether a brake slip-controlled actuation may be implemented correctly by an ABS control valve.

8. The electronically controllable brake system as claimed in claim 6, wherein the brake system is a hydraulic brake system or a pneumatic brake system.

9. A vehicle having an electronically controlled brake system as claimed in claim 6.

* * * * *